United States Patent
Omura et al.

(10) Patent No.: US 8,137,230 B2
(45) Date of Patent: Mar. 20, 2012

(54) REDUCTION GEAR

(75) Inventors: Masahiro Omura, Nagoya (JP); Atsushi Torii, Nishio (JP); Kenichi Katae, Kariya (JP)

(73) Assignees: Aisin Seiki Kabushiki Kaisha, Kariya-Shi, Aichi (JP); Kabushiki Kaisha Toyota Jidoshokki, Kariya-Shi, Aichi (JP)

( * ) Notice: Subject to any disclaimer, the term of this patent is extended or adjusted under 35 U.S.C. 154(b) by 256 days.

(21) Appl. No.: 12/442,055

(22) PCT Filed: Oct. 25, 2007

(86) PCT No.: PCT/JP2007/070808
§ 371 (c)(1),
(2), (4) Date: Mar. 24, 2009

(87) PCT Pub. No.: WO2008/053775
PCT Pub. Date: May 8, 2008

(65) Prior Publication Data
US 2010/0009802 A1    Jan. 14, 2010

(30) Foreign Application Priority Data
Oct. 31, 2006 (JP) .................................. 2006-295555

(51) Int. Cl.
*F16H 48/06* (2006.01)
(52) U.S. Cl. ........................................ 475/149; 180/65.6
(58) Field of Classification Search ............. 475/5, 149, 475/150, 903; 180/65.6
See application file for complete search history.

(56) References Cited

U.S. PATENT DOCUMENTS

| 7,314,421 B2 * | 1/2008 | Kim ................................ 475/5 |
| 2002/0094898 A1 * | 7/2002 | Hata et al. ...................... 475/5 |
| 2005/0006164 A1 * | 1/2005 | Teraoka ....................... 475/149 |

FOREIGN PATENT DOCUMENTS

| DE | 10 2004 048 700 A1 | 5/2006 |
| FR | 845 695 | 8/1939 |
| GB | 2 062 558 | 5/1981 |
| JP | 7-1349 A | 1/1995 |
| JP | 2000-189826 A | 7/2000 |

(Continued)

OTHER PUBLICATIONS

International Preliminary Report on Patentability and Written Opinion (Forms PCT/IB/326, PCT/IB/373, PCT/ISA/237), issued in PCT/JP2007/070808, May 14, 2009, The International Bureau of WIPO, Geneva, CH; and English-language translation thereof (Forms PCT/IB/338, PCT/IB/373 and PCT/ISA/237).

(Continued)

*Primary Examiner* — David D Le
*Assistant Examiner* — Derek D Knight
(74) *Attorney, Agent, or Firm* — Buchanan, Ingersoll & Rooney PC (57) ABSTRACT

A reduction gear having a planetary gear set for reducing the output rotation speed of a motor, a counter gear set for reducing the output rotation speed of the planetary gear set, and a planetary gear set for reducing the output rotation speed of the counter gear set. The output shaft and input shaft that are on the same axis and belong to the planetary gear set are arranged in parallel with the output shaft and input shaft that are on the same axis and belong to the planetary gear set. The input shaft of the counter gear set is common to the output shaft of the planetary gear set. The output shaft of the counter gear set acts commonly as the input shaft of the planetary gear set.

23 Claims, 5 Drawing Sheets

FOREIGN PATENT DOCUMENTS

| | | |
|---|---|---|
| JP | 2002-137816 A | 5/2002 |
| JP | 2003-278876 A | 10/2003 |
| JP | 2005-42846 A | 2/2005 |
| JP | 2006-63809 A | 3/2006 |
| WO | WO 91/19916 A1 | 12/1991 |

OTHER PUBLICATIONS

Supplementary Search Report issued in May 2010, by the European Patent Office in European Patent Application No. 07 83 0542.

Nagata, Hisao et al., "Toyota three wheel type battery-powered forklift GENEO-E", Toyota Jidoshokki Giho, Kabushikikaisha Toyota Jidoshokki (Toyota Industries Corporation), No. 47, Jul. 2003, pp. 33-39 (discussed on pp. 1-3 of application).

International Search Report (PCT/ISA/210) dated Nov. 16, 2007.

Written Opinion (PCT/ISA/237) dated Nov. 16, 2007.

Official Action issued on Nov. 7, 2011 by the Japanese Patent Office in corresponding Japanese Patent Application No. 2008-542070, and English language translation of the Official Action.

\* cited by examiner

CONVENTIONAL EXAMPLE 1

PRIOR ART

FIG.4B

PRIOR ART

FIG.5A

CONVENTIONAL EXAMPLE 2

PRIOR ART

FIG.5B

PRIOR ART

REDUCTION GEAR

REFERENCE TO RELATED APPLICATION

This application is based upon and claims the benefit of the priority of Japanese patent application No. 2006-295555, filed on Oct. 31, 2006, the disclosure of which is incorporated herein in its entirety by reference thereto.

TECHNICAL FIELD

This invention relates to a reduction gear, and particularly relates to a reduction gear having a plurality of combined gear sets.

BACKGROUND ART

Figure 4A:
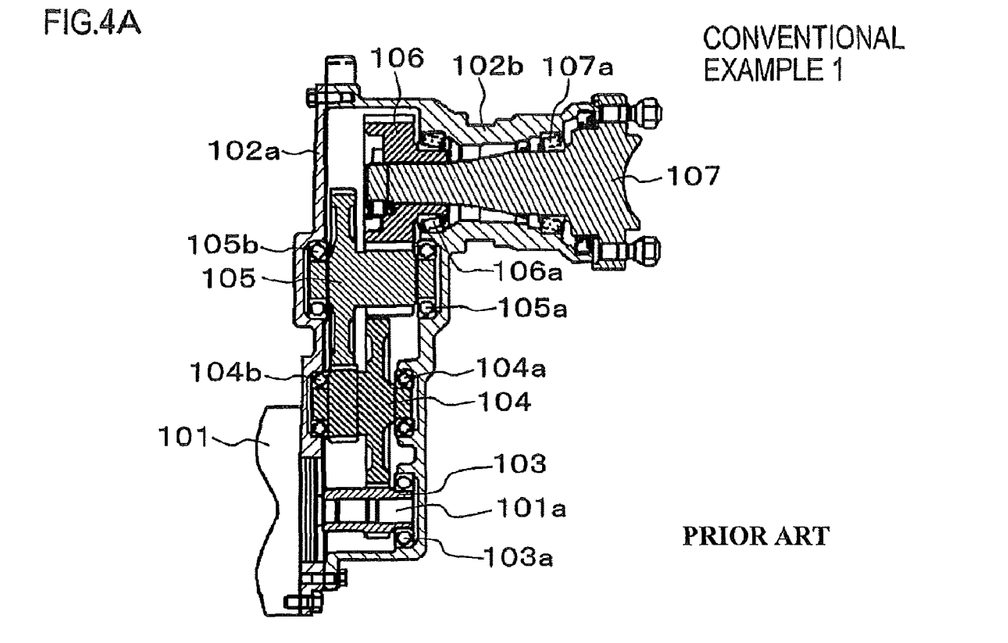
FIG. 4 shows a schematic sectional view of a structure of a reduction gear according to a conventional example 1.
Figure 4B:
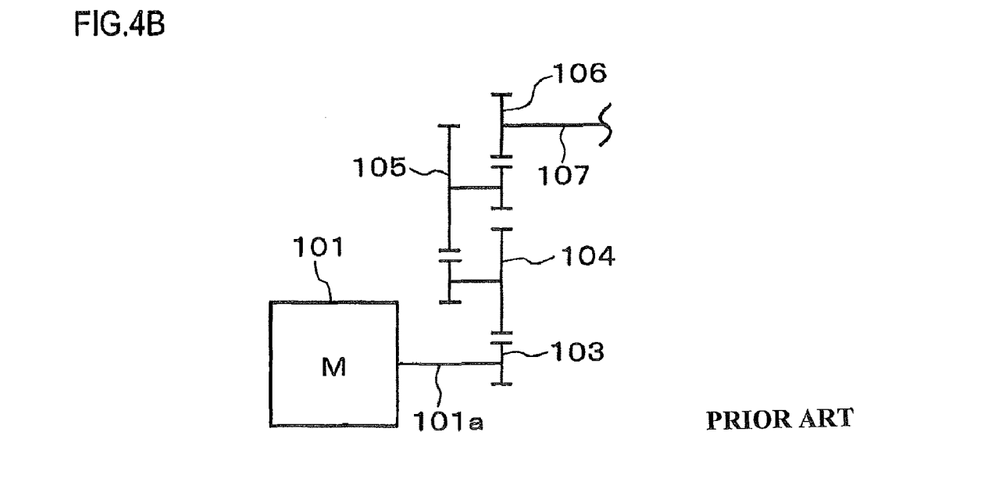

A reduction gear (conventional art 1; see FIG. 4) in which multistage reduction mechanisms are combined using parallel-axis-gears (helical gears, for example), or a reduction gear (conventional art 2; see FIG. 5) in which a single stage reduction mechanism and a couple of planetary gear set are combined using parallel-axis-gears is known as a conventional reduction gear for an electric vehicle (see Non-Patent Document 1). The reduction gear according to the conventional art 1 has a merit of a simple structure and less number of components. The reduction gear according to the conventional art 2 has a merit of a compact size of a transmission because deceleration can be done in a condition that a rotation shaft of a sun gear portion 203b and an output shaft 207 are coaxial in the planetary gear mechanism.

[Non-Patent Document 1]
Nagata, Hisao, et. al., "Toyota three wheel type battery-powered forklift "GENEO-E"", Toyota Jidoshokki Giho, Kabushikikaisha Toyota Jidoshokki (TOYOTA INDUSTRIES CORPORATION), No. 47, p 33-39 (2003, July).

DISCLOSURE OF THE INVENTION

Problems to be Solved by the Invention

The following analyses are based on the present invention. The entire disclosure of Non-Patent Documents 1 is incorporated herein by reference thereto.

When a high reduction rate is intended using only parallel-axis-gear mechanisms such as the conventional art 1, offset of an input shaft 101a and an output shaft 107 becomes large as the reduction rate becomes large since each of rotation shafts has to be provided with a gear which have to be faced each other. A width (in right and left directions in FIG. 4) of the reduction gear according to the conventional art 1 becomes wide as the number of the gears increases because a width (axial length) of the gear becomes large as the reduction rate becomes large. Thus a size of a motor 101 coupled with the reduction gear according to the conventional art 1 may become small, offering a fear that it becomes difficult to increase output power. In addition, the parallel-axis-gears 104 and 105 require bearings 104a, 104b, 105a and 105b on both sides and therefore the width (in right and left directions in FIG. 4) becomes wide because the widths of the bearings are necessary besides the widths of the gears.

Figure 5A:
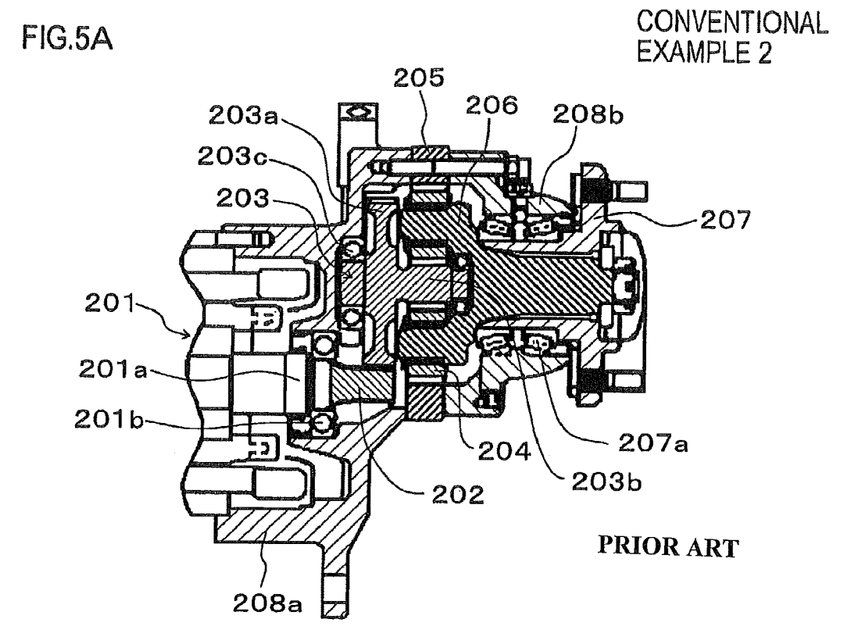
FIG. 5 shows a schematic sectional view of a structure of a reduction gear according to a conventional example 2.
Figure 5B:
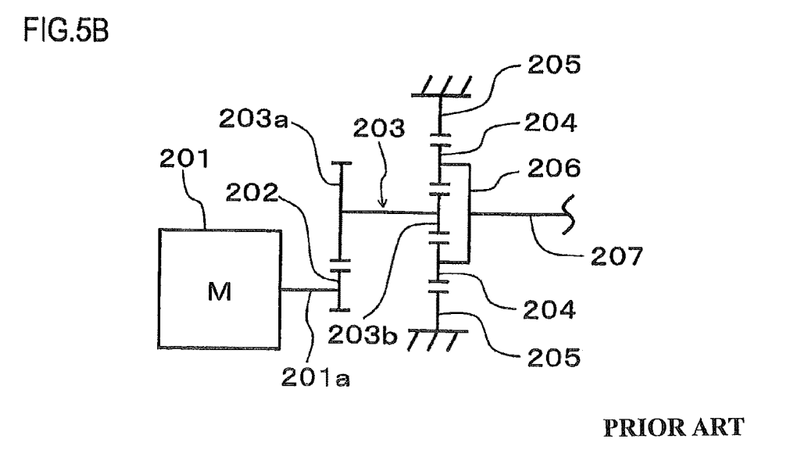

The reduction gear according to the conventional art 2 is a combination of a single stage reduction mechanism and a set of planetary gear mechanism, and therefore it may be possible to decrease an offset of an input shaft 201a and the output shaft 207 in a small number of components. However, the reduction rate may become small to the contrary.

It is a main object of the present invention to reduce an offset of an input shaft and an output shaft while increasing a reduction rate.

Means to Solve the Problems

According to a first aspect of the present invention, there is provided a reduction gear comprising: a first planetary gear set reducing an output rotation speed of a power source, a counter gear set reducing an output rotation speed of the first planetary gear set, and a second planetary gear set reducing an output rotation speed of the counter gear set. An output shaft and an input shaft coaxially disposed in the first planetary gear set are arranged in parallel with an output shaft and an input shaft coaxially disposed in the second planetary gear set. An input shaft or a center axis of the input shaft of the counter gear set is shared with (is common to) the output shaft or a center axis of the output shaft of the first planetary gear set. An output shaft or a center axis of the output shaft of the counter gear set is shared with (acts commonly as) the input shaft or a center axis of the input shaft of the second planetary gear set, preferably.

Preferably, all or a part of the first planetary gear set and the second planetary gear set are arranged on a same plane perpendicular to an axis of the first planetary gear set.

The reduction gear of the present invention preferably comprises a first bearing rotationally supporting a part of the gears of the counter gear set, the first bearing being arranged within at least partially of an inner circumferential area of a gear width (axial length) of the part of the gears.

The reduction gear of the present invention preferably comprises a second bearing rotationally supporting a carrier of the second planetary gear set and being arranged in an inner circumferential area of the carrier.

The counter gear set is preferably composed of a counter drive gear rotating in unison with the output shaft of the first planetary gear set, an idler gear engaging with the first counter gear, and a counter driven gear engaging with the idler gear and rotating in unison with the input shaft of the second planetary gear set in one body.

According to a second aspect of the present invention, there is provided a reduction gear comprising: a first planetary gear set reducing an output rotation speed of a power source, a counter gear set reducing an output rotation speed of the first planetary gear set, and a second planetary gear set reducing an output rotation speed of the counter gear set. An output shaft and an input shaft of the first planetary gear set are arranged coaxially. An output shaft and an input shaft of the second planetary gear set are arranged coaxially. The output shaft and the input shaft of the first planetary gear set are arranged in parallel with the output shaft and the input shaft of the second planetary gear set. A center axis of an input shaft of the counter gear set is shared with (is common to) a center axis of the output shaft of the first planetary gear set. A center axis of an output shaft of the counter gear set is shared with (is common to) a center axis of the input shaft of the second planetary gear set.

Meritorious Effects of the Invention

According to the present invention, offset of an input shaft and an output shaft of a reduction gear can be decreased while increasing a reduction rate (torque). Gear widths (axial lengths) of a first planetary gear set and a first [sic. second] planetary gear set will be determined smaller than that of the counter gear set because the planetary gear sets share a loaded torque according to the number of the planetary gears. A first bearing is arranged in at least partially of an inner circumferential area of a width of a gear in the counter gear set, and it makes an axial width of the whole reduction gear small. The axial width of the reduction gear can be also reduced because a second bearing is arranged at an inner circumferential area of a carrier of a second planetary gear set. In addition, downsizing of the reduction gear becomes possible by placing an idler gear between the counter drive gear and the counter driven gear and the size of the reduction gear may be adjusted according to a size of a power source.

EXPLANATIONS OF SYMBOLS 1 motor
1a output shaft
2a, 2b, 2c casing member
3 differential gear set
4a, 4b wheel shaft
10 planetary gear set
11 sun gear
12 pinion gear
13 ring gear
14 carrier
14a shaft portion
14b, 14c hub portion
15a, 15b bearing
16 counter drive gear
20 idler gear
30 counter driven gear member
30a counter driven gear portion
30b hub portion
31a, 31b bearing
40 planetary gear set
41 sun gear
42 pinion gear
43 ring gear
44 carrier
44a shaft portion
44b, 44c hub portion
45a, 45b bearing
101 motor
101a input shaft
102a, 102b casing
103 first parallel gear
103a bearing
104 second parallel gear
104a, 104b bearing
105 third parallel gear
105a, 105b bearing
106 fourth parallel gear
106a bearing
107 output shaft
107a bearing
201 motor
201a input shaft
201b bearing
202 pinion gear
203 gear
203a parallel gear portion
203b sun gear portion
203c bearing
204 pinion gear
205 ring gear
206 carrier
207 output shaft
207a bearing
208a, 208b casing member

PREFERRED MODES FOR CARRYING OUT THE INVENTION

Example 1

Figure 1:
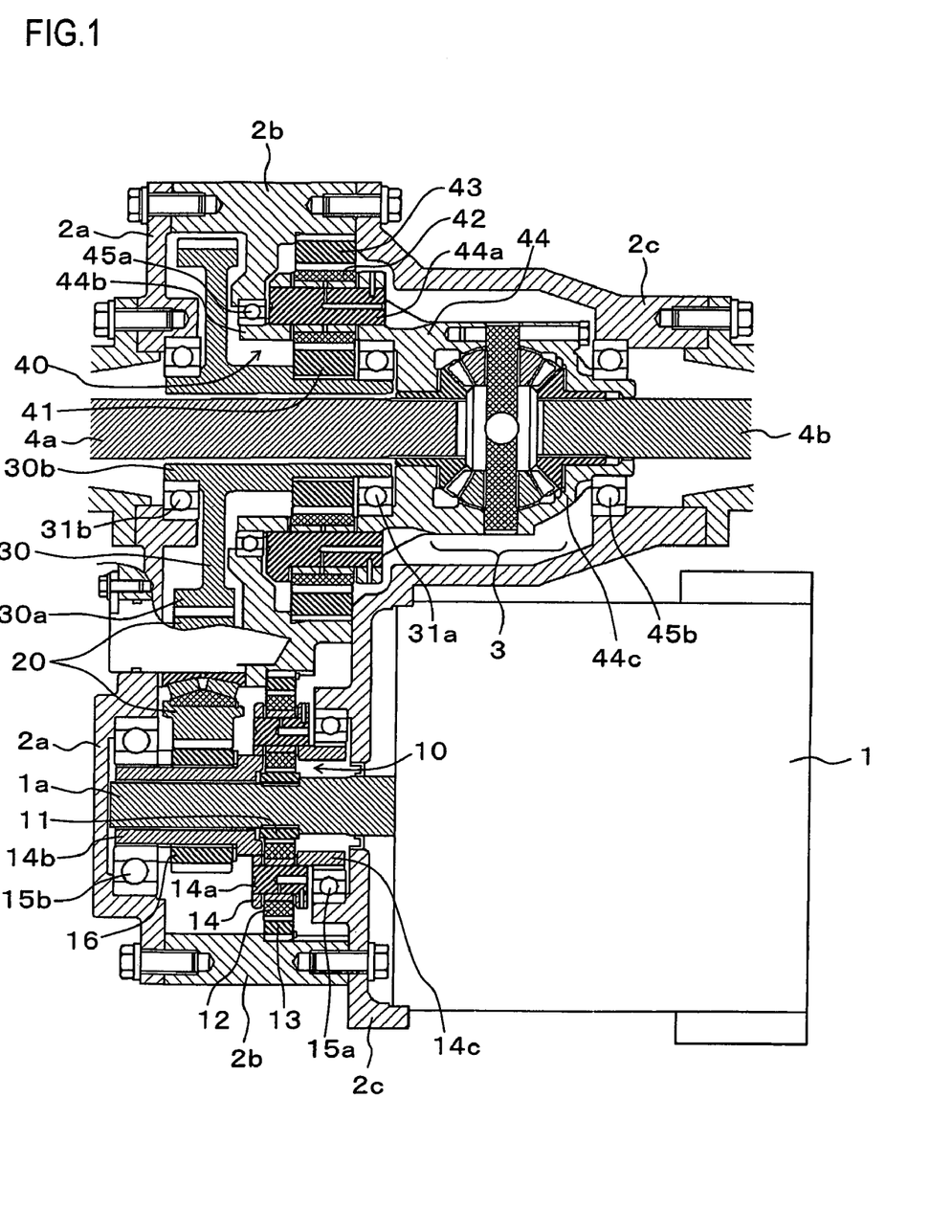
FIG. 1 shows a schematic sectional view of a structure of a reduction gear according to an example 1 of the present invention.
Figure 2:
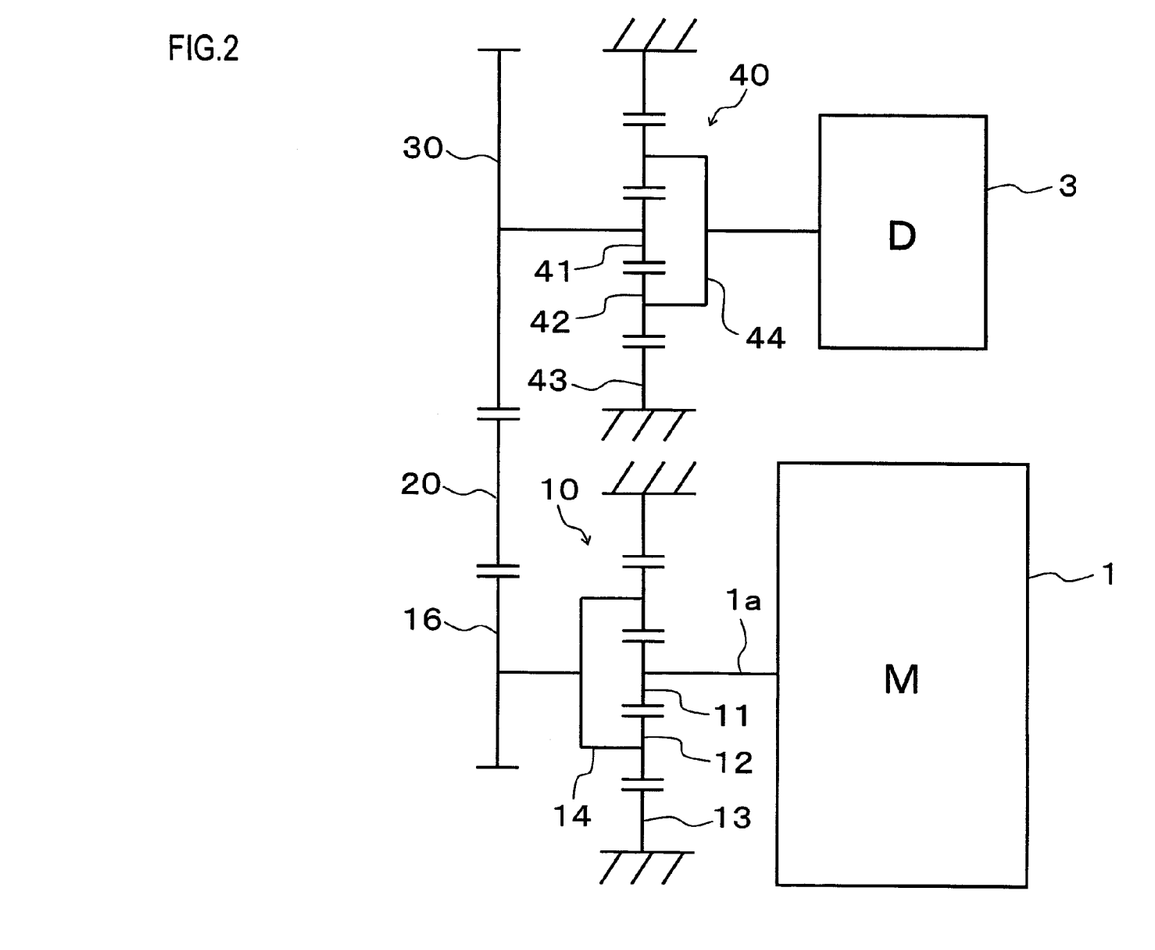
FIG. 2 shows a schematic diagram of a gear train of the reduction gear according to an example 1 of the present invention.

An example 1 according to the present invention will be explained with reference to figures. FIG. 1 shows a schematic sectional view of a structure of a reduction gear according to an example 1 of the present invention. FIG. 2 shows a schematic diagram of a gear train of the reduction gear according to an example 1 of the present invention.

The reduction gear according to an example 1 is used for an electric vehicle such as a battery-powered forklift, for example. The reduction gear outputs a reduced generating power of a motor 1 to a differential gear set. The reduction gear comprises: the motor 1, casing members 2a, 2b and 2c, planetary gear set 10, counter drive gear 16, idler gear 20, counter driven gear member 30, planetary gear set 40 and differential gear set 3.

The motor 1 is an electric motor as a power source and is attached on the casing member 2c. The motor 1 comprises an output shaft 1a so as to output a rotation power. The output shaft 1a penetrates an opening formed on the casing member 2c and extends into an assembled casing enclosed by the casing members 2a, 2b and 2c.

The casing member 2a is a member formed into a determined shape. The casing member 2a is fixed on the casing member 2b from one axial side (left side of FIG. 1) using bolts. The casing member 2a has a base portion to mount a bearing 15b at an outer circumferential area of the output shaft 1a in the casing. The casing member 2a rotationally supports an idler gear 20. The casing member 2a has a base portion to mount a bearing 31b at an outer circumferential area of a hub portion 30b of the counter driven gear member 30 in the casing.

The casing member 2b is a member formed into a determined shape. The casing members 2a and 2c are attached on each axial side of the casing member 2b, respectively, using bolts. The casing member 2b is formed so as to cover the output shaft 1a, planetary gear set 10, counter drive gear 16, idler gear 20, counter driven gear member 30 and planetary gear set 40, mainly. A ring gear 13 is attached on the casing member 2b at an outer circumferential portion of the ring gear 13 by a spline and the casing member 2b prevents a relative rotation of the ring gear 13. A ring gear 43 is attached on the casing member 2b at an outer circumferential portion of the ring gear 43 by a spline and the casing member 2b prevents a relative rotation of the ring gear 43. The casing member 2b has a protrusion portion at an outer circumferential portion of a hub portion 44b to mount a bearing 45a.

The casing member 2c is a member formed into a determined shape. The casing member 2c is formed so as to cover the differential gear set 3 mainly. The casing member 2c is fixed on the casing member 2b from one axial side (left side of FIG. 1) using bolts. The motor 1 is attached on the exterior portion of the casing 2c. the casing member 2c has an opening so as to insert the output shaft 1a of the motor 1 into the casing. The casing member 2c has a protrusion portion inside the casing and at a periphery of the output shaft 1a, to mount a bearing 15a. The casing member 2c has a base portion inside the casing and at a periphery of a hub portion 44c of a carrier 44, to mount a bearing 45b.

The planetary gear set 10 is a reduction mechanism in which a pinion gear 12 that engages a ring gear 13 with a sun gear 11 revolves around the sun gear 11 and a carrier 14 that rotationally supports the pinion gear 12 rotates as a result of a rotation of the sun gear 11 in the fixed ring gear 13. The planetary gear set 10 reduces the input rotation speed of the sun gear 11 and outputs as a rotation of the carrier 14. All or a part of the planetary gear set 10 is arranged with the planetary gear set 40 on the same plane perpendicular to the shaft thereof and it makes a width of the whole reduction gear small. The shaft of the planetary gear set 10 and the shaft of the planetary gear set 40 are parallel. The planetary gear set 10 comprises the sun gear 11, pinion gear 12, ring gear 13, carrier 14, bearings 15a and 15b and counter drive gear 16.

The sun gear 11 is an external (toothed) gear mounted on the output shaft 1a of the motor 1 by a spline and is prohibited to rotate relative to the output shaft 1a. The sun gear 11 engages with a plurality of pinion gears 12.

The pinion gear 12 is an external (toothed) gear that engages with the ring gear 13 and the sun gear 11 between the ring gear 13 and the sun gear 11. The pinion gear 12 revolves around the sun gear 11 as a result of the rotation of the sun gear 11. The pinion gear 12 is rotationally supported by a shaft portion 14a of the carrier 14.

The ring gear 13 is an internal (toothed) gear engaging with the pinion gear 12 at a circumferential portion of the sun gear 11 and the pinion gear 12. The ring gear 13 is mounted on the casing member 2b at an outer circumferential portion of the ring gear 13 by a spline and is prohibited to rotate relative to the casing member 2b.

The carrier 14 is a member to support each of the pinion gears 12 rotationally. The carrier 14 rotates as a result of revolution of the pinion gear 12. The carrier 14 has the shaft portion 14a, hub portion 14b and hub portion 14c. The shaft portion 14a is a portion corresponding to a rotary shaft of the pinion gear 12. The hub portion 14b is a cylindrical portion extending in a direction of the casing member 2a at a periphery of the output shaft 1a of the motor 1 with a gap against the output shaft 1a. An outer circumferential portion of the end of the hub portion 14b is rotationally supported by the bearing 15b. The counter drive gear 16 is mounted on the hub portion 14b at an outer circumferential area of a middle portion thereof by a spline and the hub portion 14b prohibits a relative rotation of the counter drive gear 16. The hub portion 14c is a cylindrical portion extending in a direction of the casing member 2c at a periphery of the output shaft 1a of the motor 1 with a gap against the output shaft 1a. An outer circumferential portion of the end of the hub portion 14c is rotationally supported by the bearing 15a.

The bearing 15a is mounted on the casing member 2c and supports the hub portion 14c rotationally. The bearing 15b is mounted on the casing member 2a and supports the hub portion 14b rotationally.

The counter drive gear 16 is an external (toothed) gear mounted on an outer circumferential area of the middle portion of the hub portion 14b by a spline and is prohibited to rotate relative to the hub portion 14b. The counter drive gear 16 engages with the idler gear 20. The counter drive gear 16 is a part of a counter gear set that composes a reduction mechanism in connection with the idler gear 20 and the counter driven gear member 30. The counter drive gear 16 is designed to have a smaller diameter than that of the counter driven gear member 30 and reduces the rotation of the counter driven gear member 30 via the idler gear 20. All or a part of the counter drive gear 16 is disposed with the idler gear 20 and the counter driven gear member 30 on the same plane perpendicular to the axes thereof and it makes the width (axial length) of the whole reduction gear small.

The idler gear 20 is an external (toothed) gear engaging with both of the counter drive gear 16 and a counter driven gear portion 30a. The idler gear 20 is a part of the counter gear set that composes the reduction mechanism in connection with the counter drive gear 16 and the counter driven gear member 30. All or a part of the idler gear 20 is arranged with the counter drive gear 16 and the counter driven gear member 30 on the same plane perpendicular to the axes thereof and it makes the width of the whole reduction gear small. The idler gear 20 is supported by the casing member 2a rotationally.

The counter driven gear member 30 is a rotary component reduced by the rotation of the counter drive gear 16 via the idler gear 20. The counter driven gear member 30 is a part of the counter gear set that composes the reduction mechanism in connection with the idler gear 20 and the counter drive gear 16. All or a part of the counter driven gear member 30 is arranged with the idler gear 20 and the counter drive gear 16 on the same plane perpendicular to the axes thereof and it makes the width of the whole reduction gear small. The counter driven gear member 30 has the counter driven gear portion 30a, hub portion 30b, bearing 31a and bearing 31b.

The counter driven gear portion 30a is a gear portion extending outwardly from the hub portion 30b. External teeth wider than a middle portion of the counter driven gear portion 30a are formed at the end portion thereof and they engage with the idler gear 20. The hub portion 30b is a cylindrical part arranged at a surrounding area of a wheel shaft 4a with a gap against the wheel shaft 4a. An outer circumferential portion of the end portion of the hub portion 30b in a direction of the casing member 2a is rotationally supported by the bearing 31b and an outer circumferential portion of the end portion of the hub portion 30b in a direction of the casing member 2c is rotationally supported by the bearing 31a. The counter driven gear portion 30a extends from the outer surface of the hub portion 30b. A sun gear 41 is mounted on the outer surface of the hub portion 30b by a spline and the hub portion 30b prohibits a relative rotation of the sun gear 41.

The bearing 31a is mounted on the carrier 44 and rotationally supports the counter driven gear member 30. The bearing 31a is arranged at an inner circumferential area of the carrier 44 and it makes the width of the whole reduction gear small. The bearing 31b is mounted on the casing member 2a and rotationally supports the counter driven gear member 30. The bearing 31b is arranged in at least a part of an inner circumferential area of a width of the counter driven gear member 30 and it makes the width of the whole reduction gear small.

The planetary gear set 40 is a reduction mechanism in which a pinion gear 42 that engages the ring gear 43 with the sun gear 41 revolves around the sun gear 41 and the carrier 44 that rotationally supports the pinion gear 42 rotates as a result of a rotation of the sun gear 41, within the fixed ring gear 43. The planetary gear set 40 reduces the input rotation speed of the sun gear 41 and outputs as the rotation of the carrier 44. The entirety or a part of the planetary gear set 40 is arranged with the planetary gear set 10 on the same plane perpendicular to the shaft thereof and it makes a width of the whole reduction gear small. The shaft of the planetary gear set 40 and the shaft of the planetary gear set 10 are parallel. The planetary gear set 40 comprises the sun gear 41, pinion gear 42, ring gear 43, carrier 44 and bearings 45a and 45b.

The sun gear 41 is an external (toothed) gear mounted on the hub portion 30b of the counter driven gear member 30 by a spline and is prohibited to rotate relative to the hub portion 30b. The sun gear 41 engages with a plurality of pinion gears 42.

The pinion gear 42 is an external (toothed) gear that engages with the ring gear 43 and the sun gear 41 between the ring gear 43 and the sun gear 41. The pinion gear 42 revolves around the sun gear 41 as a result of the rotation of the sun gear 41. The pinion gear 42 is rotationally supported by a shaft portion 44a of the carrier 44.

The ring gear 43 is an internal (toothed) gear engaging with the pinion gear 42 at an outer circumferential portion of the sun gear 41 and the pinion gear 42. The ring gear 43 is mounted on the casing member 2b at an outer circumferential portion thereof by a spline and is prohibited to rotate relative to the casing member 2b.

The carrier 44 is a member to support each of the pinion gears 42 rotationally. The carrier 44 rotates as a result of the revolution of the pinion gear 42. The carrier 44 has the shaft portion 44a, hub portion 44b and hub portion 44c. The shaft portion 44a is a portion corresponding to a rotary shaft of the pinion gear 42. The hub portion 44b is a cylindrical portion extending in a direction of the casing member 2a at a periphery of the hub portion 30b of the counter driven gear member 30 with a gap against the hub portion 30b. An outer circumferential portion of the end of the hub portion 44b is rotationally supported by the bearing 31b [sic. 45a]. The hub portion 44c is a cylindrical portion extending in a direction of the casing member 2c at a periphery of the hub portion 30b of the counter driven gear member 30 and the differential gear set 3 with a gap against the hub portion 30b. An outer circumferential portion of the end of the hub portion 44c is rotationally supported by the bearing 45b, and the bearing 31a is mounted at an inner circumferential portion on the side of the pinion gear 42. The hub portion 44c corresponds to an input shaft of the differential gear set 3.

The bearing 45a is mounted on the casing member 2b and rotationally supports the hub portion 44b. The bearing 45b is mounted on the casing member 2c and rotationally supports the hub portion 44c.

The differential gear set 3 is a component using a bevel gear so as to absorb a rotation difference between the wheel shaft 4a and 4b and achieve a smooth running.

A gear train of the reduction gear described above is schematically shown in FIG. 2.

According to an example 1 of the present invention, the output shaft (center axis of the carrier 14) and the input shaft (center axis of the sun gear 11) that are on the same axis or arranged coaxially of the planetary gear set 10 are arranged in parallel with the output shaft (center axis of the carrier 44) and the input shaft (center axis of the sun gear 41) that are on the same axis or arranged coaxially of the planetary gear set 40.

The input shaft (center axis of the counter drive gear 16) of the counter gear set (16, 20, 30) is shared with (is common to) the output shaft (center axis of the carrier 14) of the planetary gear set 10 and the output shaft (center axis of the driven gear member 30) of the counter gear set (16, 20, 30) is shared with (is common to) the input shaft (center axis of the sun gear 41) of the planetary gear set 40.

Figure 3:
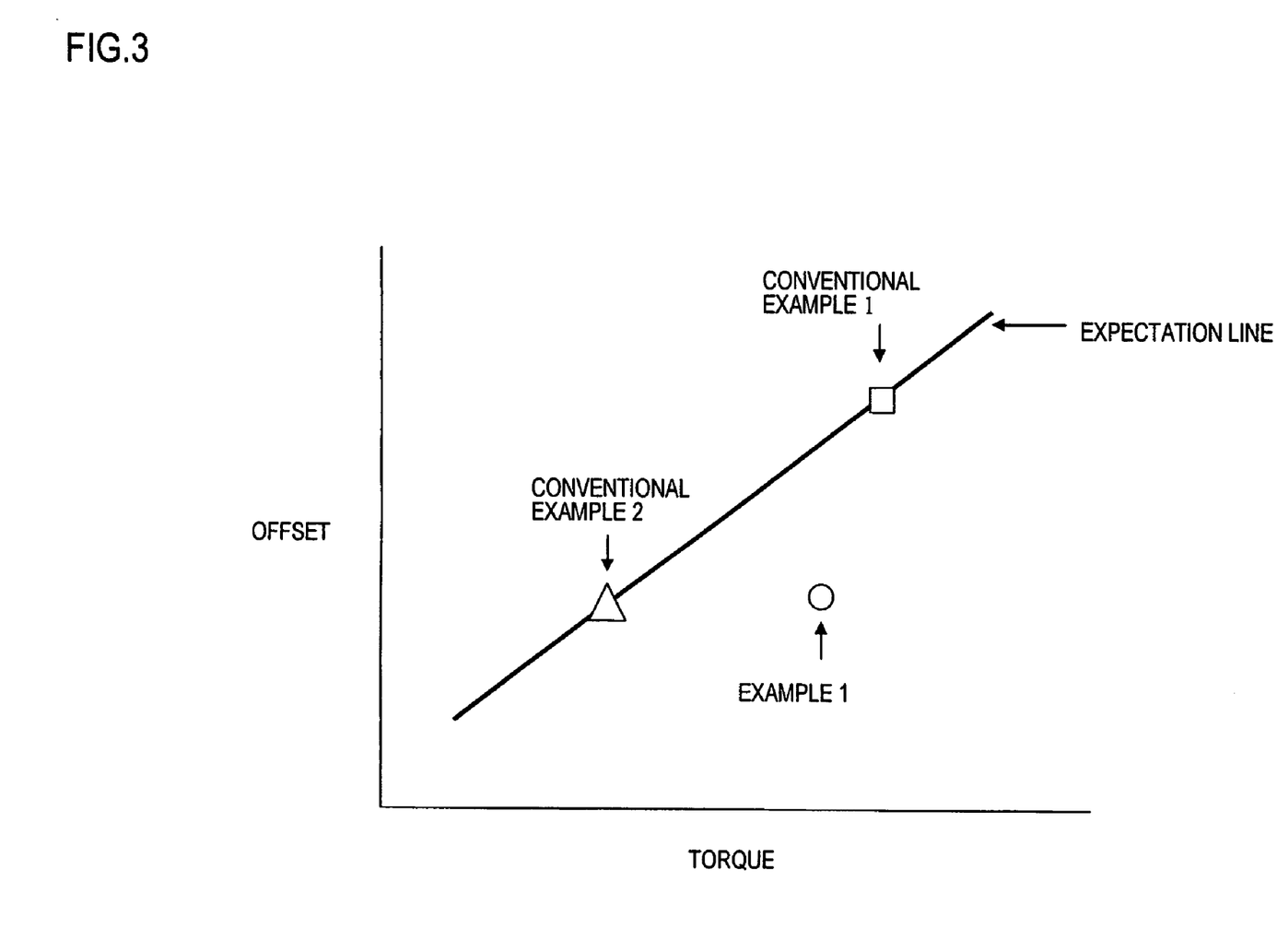
FIG. 3 shows a graph for illustrating a relation between a torque and an offset of a reduction gear.

Therefore, the width (offset) between the input shaft (output shaft 1a of the motor 1) and the output shaft (wheel shafts 4a and 4b) can be decreased while the reduction rate (torque) is increased (see FIG. 3). A conventional example 1 (FIG. 4) and a conventional example 2 (FIG. 5) have characteristics on an expectation line that is a general performance line as shown in FIG. 3, however, the reduction gear according to an example 1 shows a performance of smaller offset with high torque that is apart from the expectation line. Gear widths of planetary gear sets 10 and 40 can be determined smaller than that of the counter gear set because the planetary gear sets share a loaded torque according to the number of the planetary gears. The entirety or a part of the planetary gear set 10 is arranged with the planetary gear set 40 on the same plane perpendicular to the shaft thereof and it makes the axial width of the whole reduction gear small. The bearing 31b is arranged in at least partially of an inner circumferential area of a gear width of the counter driven gear member 30 of the counter gear set and it makes the axial width of the whole reduction gear small. In addition, the bearing 31a is arranged in an inner circumferential area of the carrier 44 of the planetary gear set 40 and it also makes the axial width of the whole reduction gear small.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modification aforementioned.

The invention claimed is:

1. A reduction gear comprising:
   a first planetary gear set reducing an output rotation speed of a power source, the first planetary gear set possessing a first ring gear,
   a counter gear set reducing an output rotation speed of the first planetary gear set, and
   a second planetary gear set reducing an output rotation speed of the counter gear set, the second planetary gear set possessing a second ring gear, wherein
   an output shaft and an input shaft coaxially disposed in the first planetary gear set are arranged in parallel with an output shaft and an input shaft coaxially disposed in the second planetary gear set,
   an input shaft of the counter gear set is common to the output shaft of the first planetary gear set,
   an output shaft of the counter gear set is common to the input shaft of the second planetary gear set,
   an output gear of the counter gear set and a wheel shaft are coaxial, and
   the first ring gear and the second ring gear are rotationally fixed relative to a case.

2. The reduction gear according to claim 1, wherein all or a part of the first planetary gear set and the second planetary gear set are arranged on a same plane perpendicular to an axis of the first planetary gear set.

3. The reduction gear according to claim 1, comprising a first bearing rotationally supporting a part of gears of the counter gear set, said first bearing being arranged in at least partially of an inner circumferential area of a gear width of said part of the gears.

4. The reduction gear according to claim 1, comprising a second bearing rotationally supporting a carrier of the second planetary gear set and being arranged at an inner circumferential area of the carrier.

5. The reduction gear according to claim 1, wherein the counter gear set is composed of a counter drive gear rotating in unison with the output shaft of the first planetary gear set, an idler gear engaging with the counter drive gear, and the output gear engaging with the idler gear and rotating in unison with the input shaft of the second planetary gear set.

6. A reduction gear comprising:
a first planetary gear set reducing an output rotation speed of a power source, the first planetary gear set possessing a first ring gear,
a counter gear set reducing an output rotation speed of the first planetary gear set, and
a second planetary gear set reducing an output rotation speed of the counter gear set, the second planetary gear set possessing a second ring gear, and
a case covering an outer circumference of the first planetary gear set and an outer circumference of the second planetary gear set, wherein
an output shaft and an input shaft of the first planetary gear set are arranged coaxially,
an output shaft and an input shaft of the second planetary gear set are arranged coaxially,
the output shaft and the input shaft of the first planetary gear set are arranged in parallel with the output shaft and the input shaft of the second planetary gear set,
a center axis of an input shaft of the counter gear set is common to a center axis of the output shaft of the first planetary gear set,
a center axis of an output shaft of the counter gear set is common to a center axis of the input shaft of the second planetary gear set,
an output gear of the counter gear set and a wheel shaft are coaxial, and
the first ring gear and the second ring gear are rotationally fixed relative to the case.

7. The reduction gear according to claim 2, comprising a first bearing rotationally supporting a part of gears of the counter gear set, said first bearing being arranged in at least partially of an inner circumferential area of a gear width of said part of the gears.

8. The reduction gear according to claim 2, comprising a second bearing rotationally supporting a carrier of the second planetary gear set and being arranged at an inner circumferential area of the carrier.

9. The reduction gear according to claim 3, comprising a second bearing rotationally supporting a carrier of the second planetary gear set and being arranged at an inner circumferential area of the carrier.

10. The reduction gear according to claim 2, wherein the counter gear set is composed of a counter drive gear rotating in unison with the output shaft of the first planetary gear set, an idler gear engaging with the counter drive gear, and the output gear engaging with the idler gear and rotating in unison with the input shaft of the second planetary gear set.

11. The reduction gear according to claim 3, wherein the counter gear set is composed of a counter drive gear rotating in unison with the output shaft of the first planetary gear set, an idler gear engaging with the counter drive gear, and the output gear engaging with the idler gear and rotating in unison with the input shaft of the second planetary gear set.

12. The reduction gear according to claim 4, wherein the counter gear set is composed of a counter drive gear rotating in unison with the output shaft of the first planetary gear set, an idler gear engaging with the counter drive gear, and the output gear engaging with the idler gear and rotating in unison with the input shaft of the second planetary gear set.

13. A reduction gear comprising:
a first planetary gear set reducing an output rotation speed of a power source, the first planetary gear set possessing a first ring gear;
a counter gear set reducing an output rotation speed of the first planetary gear set; and
a second planetary gear set reducing an output rotation speed of the counter gear set, the second planetary gear set possessing a second ring gear; and
a case covering an outer circumference of the first planetary gear set and an outer circumference of the second planetary gear set, wherein
an output shaft and an input shaft coaxially disposed in the first planetary gear set are arranged in parallel with an output shaft and an input shaft coaxially disposed in the second planetary gear set,
an input shaft of the counter gear set is common to the output shaft of the first planetary gear set,
an output shaft of the counter gear set is common to the input shaft of the second planetary gear set, and
an output gear of the counter gear set and a wheel shaft are arranged coaxially;
the first ring gear and the second ring gear are mounted on the case;
the first ring gear and the second ring gear are rotationally fixed relative to the case;
and wherein all or a part of the first planetary gear set and the second planetary gear set are arranged on a same plane perpendicular to an axis of the first planetary gear set;
said reduction gear further comprising:
a first bearing rotationally supporting a part of gears of the counter gear set, said first bearing being arranged in at least partially of an inner circumferential area of a gear width of said part of the gears; and
a second bearing rotationally supporting a carrier of the second planetary gear set and being arranged at an inner circumferential area of the carrier.

14. The reduction gear according to claim 13, wherein the counter gear set is composed of a counter drive gear rotating in unison with the output shaft of the first planetary gear set, an idler gear engaging with the counter drive gear, and a counter driven gear engaging with the idler gear and rotating in unison with the input shaft of the second planetary gear set.

15. The reduction gear according to claim 1, wherein the second planetary gear set includes a carrier which is also a casing of a differential gear set.

16. The reduction gear according to claim 6, wherein the second planetary gear set includes a carrier which is also a casing of a differential gear set.

17. The reduction gear according to claim 13, wherein the second planetary gear set includes a carrier which is also a casing of a differential gear set.

18. The reduction gear according to claim 1, wherein a longitudinal axis of the wheel shaft is coaxial with a rotational axis of the second planetary gear set.

19. The reduction gear according to claim 6, wherein a longitudinal axis of the wheel shaft is coaxial with a rotational axis of the second planetary gear set.

20. The reduction gear according to claim 13, wherein a longitudinal axis of the wheel shaft is coaxial with a rotational axis of the second planetary gear set.

21. The reduction gear according to claim 1, the counter gear set comprises a counter drive gear coaxially arranged with the first planetary get set, the counter drive gear possessing an outer diameter smaller than an outer diameter of the output gear.

22. The reduction gear according to claim 6, the counter gear set comprises a counter drive gear coaxially arranged with the first planetary get set, the counter drive gear possessing an outer diameter smaller than an outer diameter of the output gear.

23. The reduction gear according to claim 13, the counter gear set comprises a counter drive gear coaxially arranged with the first planetary get set, the counter drive gear possessing an outer diameter smaller than an outer diameter of the output gear.

* * * * *